(12) United States Patent
Fukazawa et al.

(10) Patent No.: US 6,721,044 B2
(45) Date of Patent: Apr. 13, 2004

(54) EXPOSURE METER USED FOR PHOTOGRAPHING

(75) Inventors: Yasushi Fukazawa, Higashikurume (JP); Masaharu Kashima, Tokorozawa (JP); Ikuo Bunya, Asaka (JP); Tetsuo Hotta, Higashimurayama (JP)

(73) Assignee: Seknoic Corporation, Tokyo (JP)

( * ) Notice: Subject to any disclaimer, the term of this patent is extended or adjusted under 35 U.S.C. 154(b) by 14 days.

(21) Appl. No.: 10/050,177

(22) Filed: Jan. 18, 2002

(65) Prior Publication Data

US 2002/0101582 A1 Aug. 1, 2002

(30) Foreign Application Priority Data

Jan. 30, 2001 (JP) ............................. 2001-021432
Jan. 30, 2001 (JP) ............................. 2001-021433
Jan. 30, 2001 (JP) ............................. 2001-021434

(51) Int. Cl.[7] .................................................. G01J 1/42
(52) U.S. Cl. ..................... 356/222; 356/213; 356/219
(58) Field of Search ................................ 356/213–232; 359/15, 831, 834; 396/213, 268–276

(56) References Cited

U.S. PATENT DOCUMENTS

| 3,609,046 A | * | 9/1971 | Hamburger | 356/224 |
|---|---|---|---|---|
| 4,203,668 A | * | 5/1980 | Chapman | 356/215 |
| 4,364,662 A | * | 12/1982 | Yuasa et al. | 356/225 |
| 4,433,914 A | * | 2/1984 | Curran | 356/223 |
| 4,914,468 A | * | 4/1990 | Naruse et al. | 356/229 |
| 5,565,990 A | * | 10/1996 | Hosoi et al. | 356/406 |
| 5,589,934 A | * | 12/1996 | Hosoi et al. | 356/218 |
| 6,122,080 A | * | 9/2000 | Ogata | 359/15 |
| D432,555 S | * | 10/2000 | Mitsui | 356/218 |
| 6,441,977 B1 | * | 8/2002 | Mashima | 359/831 |

FOREIGN PATENT DOCUMENTS

JP        11 037 837       *  2/1999

* cited by examiner

Primary Examiner—Frank G. Font
Assistant Examiner—Sang H. Nguyen
(74) Attorney, Agent, or Firm—Pillsbury Winthrop LLP (57) ABSTRACT

An exposure meter for incident- and reflected-light photometry includes an incident-light receiving section, a finder for reflected-light photometry, an arithmetical element for calculating various exposure values on the basis of photometric results obtained by incident- and reflected-light receiving elements, a finder optical system for displaying information on the exposure values obtained by the arithmetical element in the finder, and a display window provided on an exposure meter body. The incident-light receiving section is constructed so that it is can be mounted to or dismounted from the exposure meter body and allows incident-light photometry and lighting setting photometry. The exposure meter further includes a transmitting unit, mountable in or dismountable from the exposure meter body, in which flashlight is emitted and the amount of flashlight can be adjusted in accordance with the information on the exposure values displayed on the display window.

3 Claims, 10 Drawing Sheets

EXPOSURE METER USED FOR PHOTOGRAPHING

BACKGROUND OF THE INVENTION

1. Field of the Invention

This invention relates to an exposure meter used for photographing, and in particular, to an exposure meter for incident- and reflected-light photometry which can be favorably used by a professional photographer or in a photographic studio.

2. Description of Related Art

Exposure meters for incident- and reflected-light photometry which are capable of measuring light by simply switching light to be measured to incident light on an object or reflected light from the object have been largely used by professional photographers, and various exposure meters are commercially available. In recent years, an exposure meter for incident- and reflected-light photometry has been known which incorporates a display means for digitally displaying various exposure conditions based on photometric results in order to facilitate the setting of exposure values to a still camera or a cinecamera, and a finder for visualizing a photometric area of spot light in order to allow the photometry of spot light with no parallax (refer to Japanese Patent Preliminary Publication No. Hei 8-128892). Moreover, another exposure meter has also been known in which the emission of a flash and the amount of flashlight can be controlled, by cordless operation, through a built-in remote control adjusting device (refer to Japanese Patent Publication No. Hei 7-122591).

Any of well-known exposure meters for incident- and reflected-light photometry is designed so that a light receiving section is fixedly mounted to an exposure meter body and cannot be dismounted. Thus, the problem arises that although in recent years the display of a photometric value has been digitized and a display function of the exposure meter has been diversified, such display cannot be used with a simple exposure meter for incident- and reflected-light photometry.

Furthermore, the well-known exposure meter for incident- and reflected-light photometry is not always satisfactory for a camera used by a professional photographer because the kind of exposure value to be set to the camera is highly limited. In the photometry of spot light, there is inconvenience that even though a photometric area is determined by looking through a finder, a display window for the exposure value is located at a position different from that of the finder and thus a photographer's eye must be moved from the finder to the display window in order to see the exposure value.

In any of the well-known exposure meters, the remote control device for flashlight is housed in the exposure meter body and thus the cost of the exposure meter itself is very high and prohibitive.

SUMMARY OF THE INVENTION

It is, therefore, a primary object of the present invention to provide an exposure meter for incident- and reflected-light photometry in which a light receiving section is used interchangeably, with a conventional function held, and other photometric attachments can be mounted and used instead of the light receiving section.

It is another object of the present invention to provide an exposure meter for incident- and reflected-light photometry in which various exposure values can be displayed and a photographer is capable of reading the exposure values directly while looking through a finder.

It is still another object of the present invention to provide an exposure meter for incident- and reflected-light photometry in which a flashlight emitting control device can be loaded, irrespective of relatively low cost, when necessary.

In order to achieve a first object, the exposure meter for incident- and reflected-light photometry of the present invention has, as a unit, a mount section mountable in, or demountable out of, an exposure meter body; a light-receiver raising and lowering mechanism incorporated in the mount section; and a light receiver attached to a movable section of the light-receiver raising and lowering mechanism. In this case, another mount section connectable to the above mount section is constructed in the exposure meter body so that when both the mount sections are connected, the light receiver is aligned with a light receiving element supporting cylinder provided in the exposure meter body. Whereby, an extremely useful exposure meter for incident- and reflected-light photometry can be provided in which adjustment can be made depending on the purpose of photometry and various attachments for photometry can be used for exchange.

According to the present invention, a waterproof member constructed so that the movable section and the light receiving element supporting cylinder are fitted in a watertight fashion is mounted to one of the movable section and the light receiving element supporting cylinder. The light receiver has the shape of a hemisphere of milk white color.

In order to achieve a second object, the exposure meter for incident- and reflected-light photometry of the present invention comprises an incident-light receiving section; a finder optical system for reflected-light photometry including an objective lens and an eyepiece; an arithmetical element for calculating various exposure values on the basis of photometric results obtained by incident- and reflected-light receiving elements; a display window for displaying information on the exposure values obtained by the arithmetical element; a first prism placed in the finder optical system for reflected-light photometry, reflecting incident light passing through the objective lens, even or odd numbers of times, to emerge therefrom; a second prism having an entrance surface opposite to an exit surface of the first prism and reflecting incident light from the first prism, odd or even numbers of times, to emerge toward an eyepiece; and a liquid crystal display device interposed between the first prism and the second prism. Whereby, a very advantageous exposure meter for incident- and reflected-light photometry can be provided in which information on exposure values required for photometry of various modes is displayed on the display window and the liquid crystal display device and can be viewed even in the finder.

According to the present invention, this information on exposure values includes a shutter speed, a stop value, luminance, a luminance difference, and a flashlight component ratio.

According to the present invention, the value of the shutter speed can be displayed, corresponding to a preselected stop value, and the stop value can be displayed, corresponding to a preselected shutter speed.

According to the present invention, the exposure meter is provided with an exposure correcting means in which the amount of correction always used and the amount of correction temporarily used can be set independently of each other.

In order to achieve a third object, the exposure meter for incident- and reflected-light photometry of the present invention has an incident-light photometric section, a finder for reflected-light photometry, a display window for displaying information on exposure values on the basis of photometric results brought about by incident- and reflected-light receiving elements, and a transmitting unit placed to be mountable to, or demountable out of, an exposure meter body, including an arithmetical element which is capable of calculating the total amount of flashlight and ordinary light to display the result on the display window. Whereby, the exposure meter of this type which tends to have a relatively high cost can be provided at a relatively low cost in accordance with a purchaser's desire.

According to the present invention, the transmitting unit and a housing compartment provided in the exposure meter body to house the transmitting unit are designed so that the transmitting unit can be housed in the housing compartment in a specific positional relationship alone. By doing so, an exposure meter for incident- and reflected-light photometry in which the transmitting unit can be loaded rapidly and accurately can be provided.

These and other objects as well as the features and advantages of the present invention will become apparent from the following detailed description of the preferred embodiments when taken in conjunction with the accompanying drawings.

DETAILED DESCRIPTION OF THE PREFERRED EMBODIMENTS

In accordance with the embodiments shown in the drawings, the present invention will be described in detail below.

Figure 1:
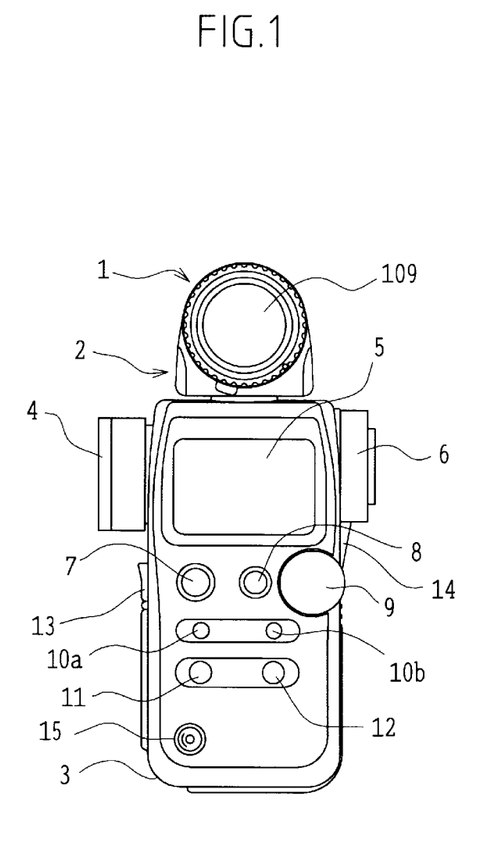
FIG. 1 is a front view showing one embodiment of the exposure meter for incident- and reflected-light photometry according to the present invention.
Figure 2:
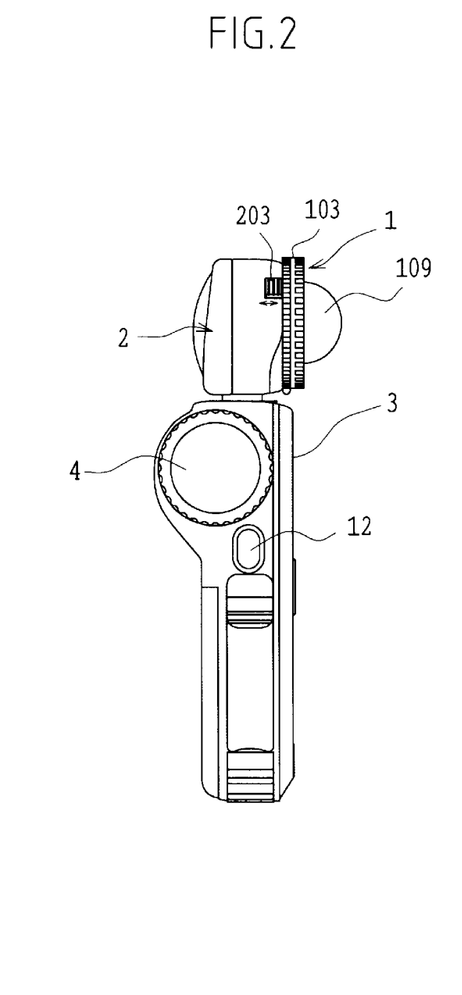
FIG. 2 is a side view showing the exposure meter of FIG. 1, looking from the left.
Figure 3:
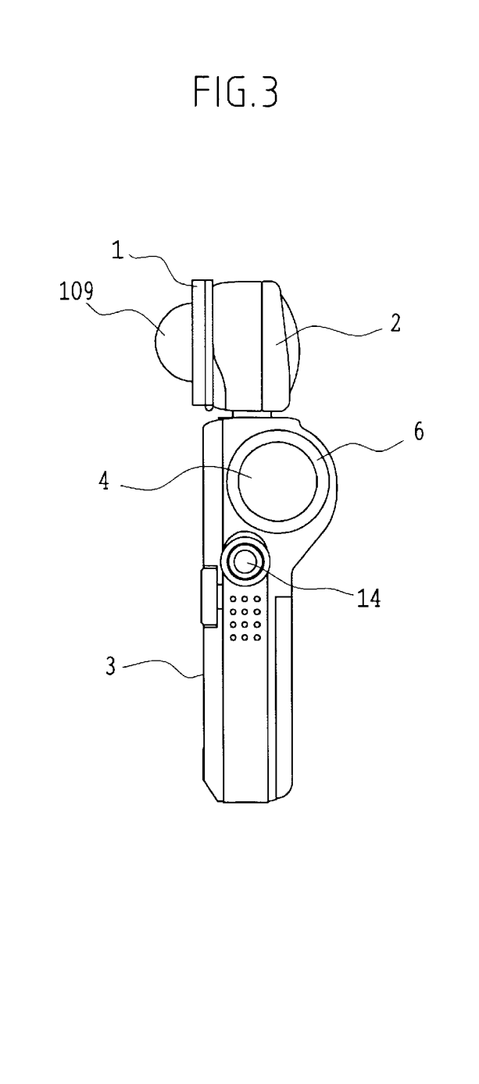
FIG. 3 is a side view showing the exposure meter of FIG. 1, looking from the right.

In FIGS. 1–3, reference numeral 1 represents an incident-light receiving section provided in the exposure meter; 2, a light receiving section body attached to an exposure meter body 3 to be rotatable over a predetermined range, supporting the incident-light receiving section 1 to be mountable and dismountable; 4, a finder for reflected-light photometry incorporated in the exposure meter body 3; 5, a liquid crystal display window for displaying information on various exposure values, provided in the exposure meter body 3; 6, a switching dial attached to an eyepiece section of the finder 4 to be rotatable, concentric with the eyepiece section, for a changeover between incident-light photometry and reflected-light photometry; 7, a power button attached to the exposure meter body 3; 8, an average monitor button attached to the exposure meter body 3; and 9, a setting and conversion dial attached to be rotatable to the exposure meter body 3. Reference numerals 10a and 10b represent ISO setting buttons, different from each other, attached to the exposure meter body 3. Reference numeral 11 represents a mode setting button attached to the exposure meter body 3; 12, a memory button attached to the exposure meter body 3; 13, a memory release button attached to the exposure meter body 3; 14, a photometry button attached to the exposure meter body 3; and 15, a synchro terminal provided in the exposure meter body 3.

Figure 4:
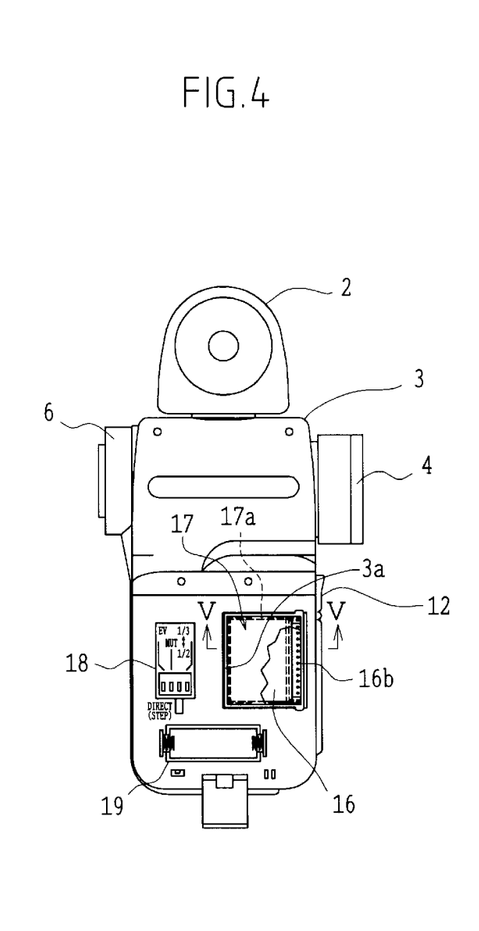
FIG. 4 is a rear view showing the exposure meter of FIG. 1 in which a back lid is removed.

In FIG. 4, reference numeral 3a represents a transmitting unit housing box with a predetermined depth, provided on the rear side of the exposure meter body 3; 16, a signal transmitting unit for emitting flashlight, packed into a case 17 which can be housed in the housing box 3a; 18, a DIP switch for setting an ordinary-light EV mode, a flashlight cordless integrating mode, and a flashlight cord-in integrating mode, provided on the rear side of the exposure meter body 3; and 19, a battery box with a predetermined depth, provided on the rear side of the exposure meter body 3. The case 17, as well as the switch 18 and the battery box 19, is covered with the back lid of the exposure meter body 3 in a normal state so that it cannot be seen from the exterior.

Figure 5:
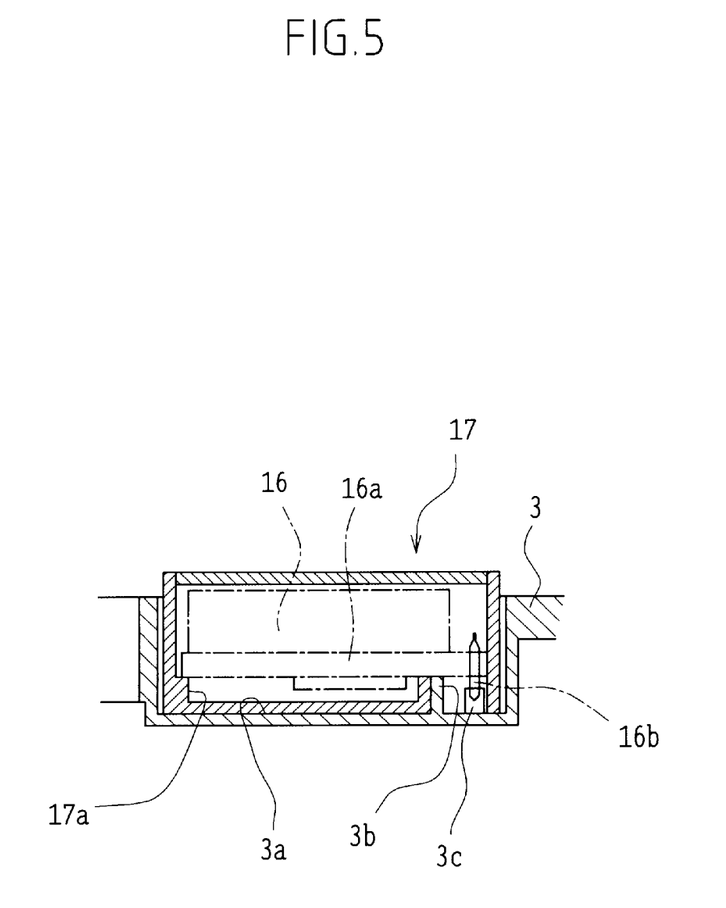
FIG. 5 is a sectional view taken along line V—V in FIG. 4.

As will be evident from FIG. 5, the case 17 has a planar shape and a depth which correspond to the planar shape and height of the transmitting unit 16 constructed as an IC substrate and is provided with an inner wall 17a, low in height, which surrounds three sides of the transmitting unit 16 to position the transmitting unit 16. At the bottom of the transmitting unit housing box 3a, a wall 3b for sustaining a terminal section 16a of the transmitting unit 16, provided with the same height as the inner wall 17a, is set upright. Moreover, from a deeper bottom of the transmitting unit housing box 3a, a plurality of connecting terminals 3c project into which a plurality of terminals 16b of the transmitting unit 16 can be fitted.

The transmitting unit housing box 3a, the transmitting unit 16, and the case 17 are constructed as mentioned above, and thus when the transmitting unit 16 is removed from a state of FIG. 4 (a state that the case 17 containing the transmitting unit 16 is loaded), a tool, such as a pincette, is used to pull up the case 17, and thereby the transmitting unit 16 can be easily taken out. For the loading of the case 17 containing the transmitting unit 16, it is dropped into the transmitting unit housing box 3a and is pressed from above. By doing so, the terminal section 16a of the transmitting unit 16 is sustained by the inner wall 17a of the case 17 and the wall 3b of the transmitting unit housing box 3a, and at the same time, the terminals 16b are fitted into the corresponding connecting terminals 3c. In this way, the connection between the transmitting unit 16 and a CPU in the exposure meter body 3 is completed. In this case, if the orientation of the loading of the transmitting unit 16, that is, the case 17, is not proper, a gap will be produced between the case 17 and the housing box 3a to cause an unstable state, and hence it is readily found that this loading is improper. The loading of the transmitting unit 16 can be thus achieved simply and accurately even at a dark place.

Figure 6:
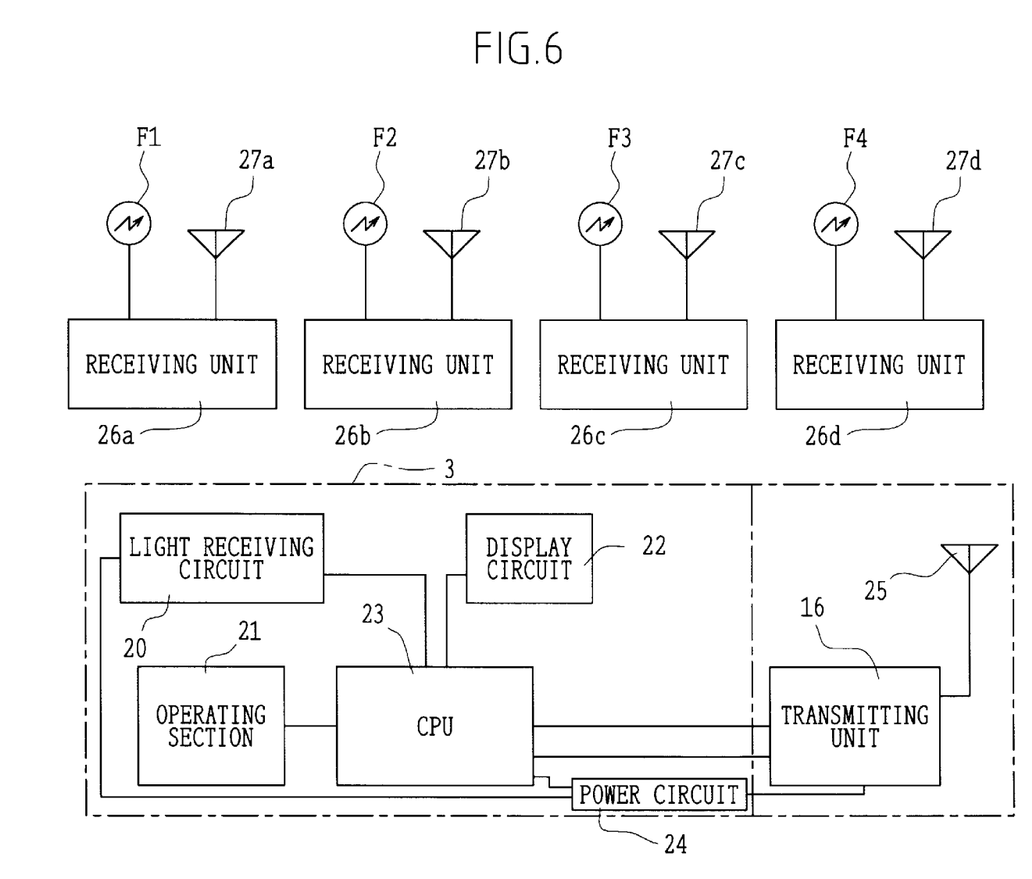
FIG. 6 is a block diagram showing schematically an exposure-value arithmetical element and a flashlight emitting device, used in the exposure meter of FIG. 1.

Subsequently, with reference to FIG. 6, a description is given of a schematic configuration of an electric control circuit incorporated in the exposure meter body 3. In this figure, reference numeral 20 designates a light receiving circuit including a reflected-light receiving element and an incident-light receiving element which are described later, a light receiving amplifier connected to these elements, and an A/D converter connected to the light receiving amplifier; 21, an operating section including the switching dial 6, the average monitor button 8, the setting and conversion dial 9, the ISO setting buttons 10a and 10b, the mode setting button 11, the memory button 12, the memory release button 13, and the photometry button 14 in FIG. 1; 22, a display circuit for displaying the information of exposure values to be displayed in the finder 4 and on the display window 5; 23, a CPU; 24, a power circuit including switches operated by a battery housed in the battery box 19 (FIG. 4) and the power button 7; and 25, a built-in antenna lying in the exposure meter body 3, connected to the transmitting unit 16 when it is loaded. Reference numerals 26a, 26b, 26c, and 26d represent a plurality of receiving units attached to a plurality of flash devices F1, F2, F3, and F4, respectively, capable of selectively energizing the flash devices F1, F2, F3, and F4 through receiving antennas 27a, 27b, 27c, and 27d, each of which is capable of receiving only a specific frequency signal emitted from the built-in antenna 25 by the transmitting unit 16.

Figure 7:
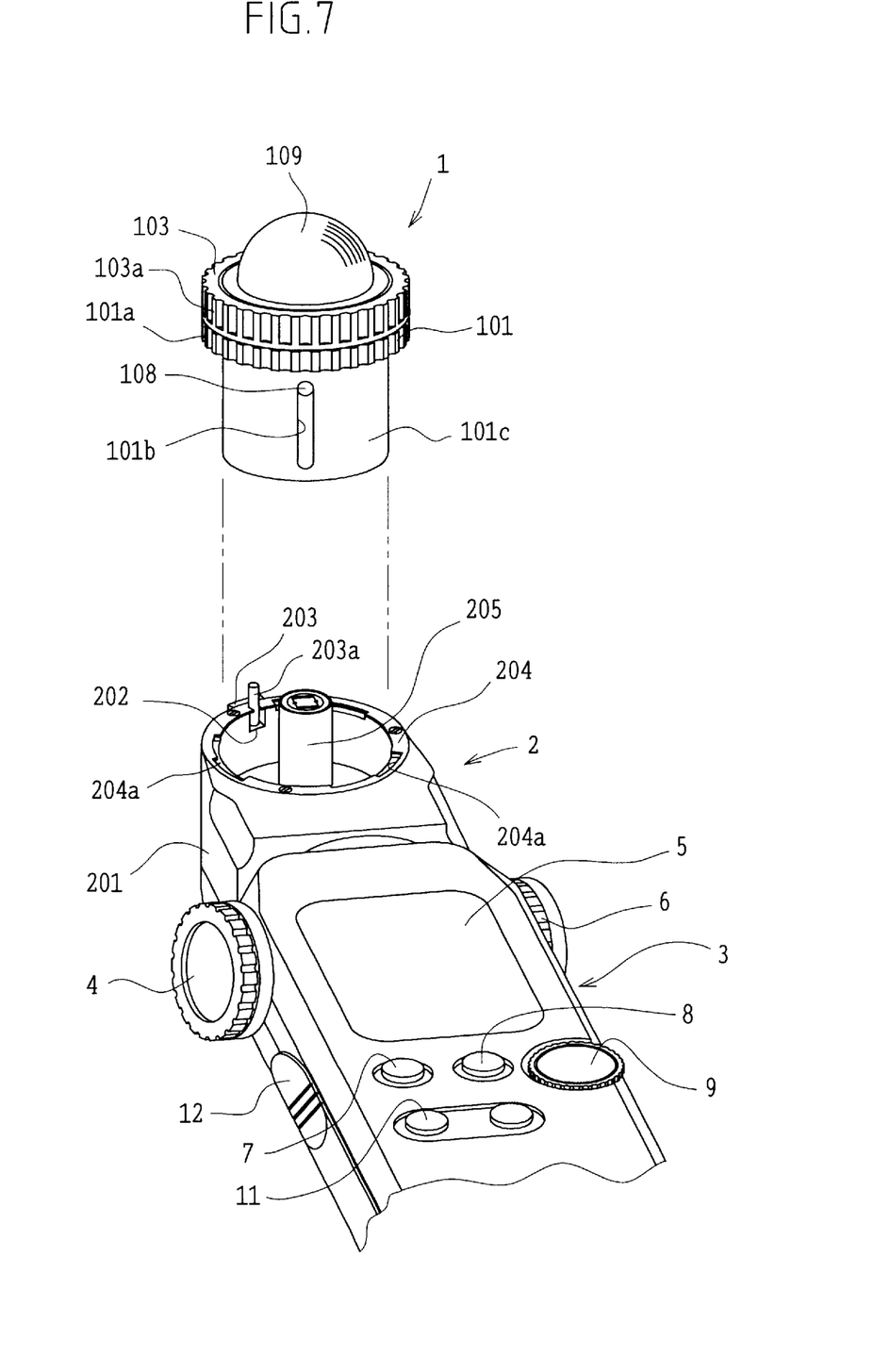
FIG. 7 is a perspective appearance view showing the exposure meter in a case where an incident-light receiving section of the exposure meter of FIG. 1 is removed from a light receiving section body.
Figure 8:
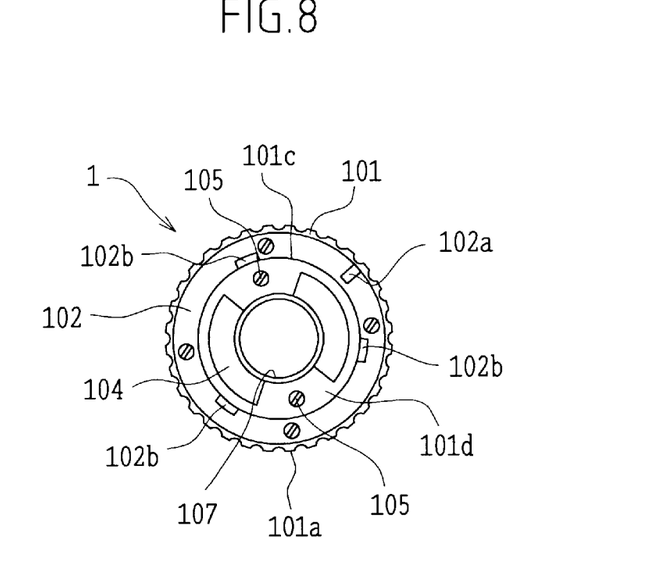
FIG. 8 is a bottom view showing the incident-light receiving section of FIG. 7.
Figure 9:
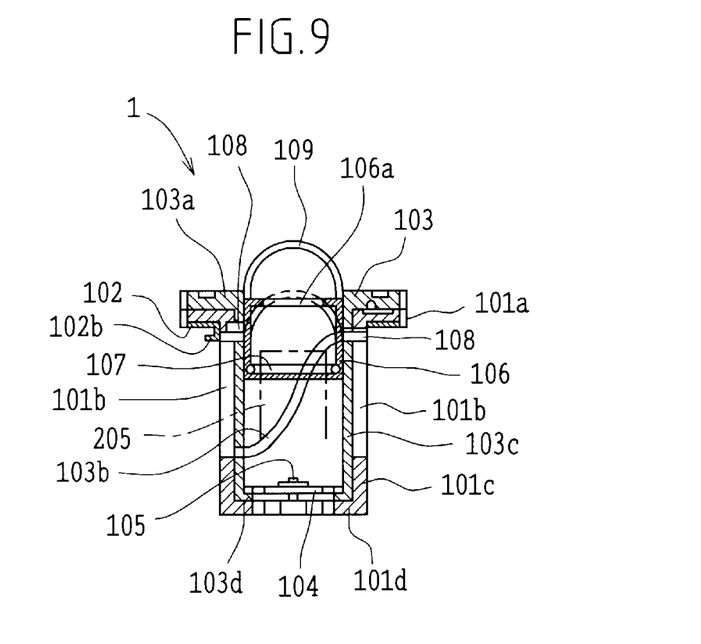
FIG. 9 is a longitudinal sectional view showing the incident-light receiving section of FIG. 7.

In accordance with FIGS. 7–9, the structure of the incident-light receiving section 1 is described in detail below. In these figures, reference numeral 101 represents an external cylinder having a top flange 101a whose peripheral surface is knurled, a hollow cylindrical portion 101c with linear slots 101b provided opposite to each other in a lengthwise direction, and a bottom flange 101d projecting into the interior; 102, a ring plate fixed to the lower surface of the top flange 101a of the external cylinder 101, having a hole 102a and three hooks 102b equally spaced along the peripheral surface of the external cylinder 101; 103, an internal cylinder fitted to be slidable into the external cylinder 101, having a top flange 103a whose peripheral surface is knurled, superposed on the top flange 101a of the external cylinder 101, a hollow cylindrical portion 103c with a pair of spiral slots 103b (in which only one slot is shown) spirally provided in its peripheral wall over the entire length, corresponding to the linear slots 101b, and a bottom flange 103d projecting into the interior; 104, a holding ring engaging the bottom flange 103d of the internal cylinder 103, mounted to the bottom flange 101d of the external cylinder 101 by a screw 105 in order to prevent the internal cylinder 103 from ascending; 106, a movable cylinder having an annular top 106a extending inward, fitted into the internal cylinder 103 so that it can be raised and lowered therein; 107, a water-seal member, such as an O-ring, fitted to an internal lower portion of the movable cylinder 106, capable of holding watertightness between a light receiving element supporting cylinder to be described later and an internal surface of the movable cylinder 106; 108, pins (in which only one pin is shown) provided on the movable cylinder 106, fitted into the linear slots 101b of the external cylinder 101 and the spiral slots 103b of the internal cylinder 103; and 109, a light receiver including a hemispherical cell of milk white color, secured on the annular top 106a of the movable cylinder 106.

Figure 10:
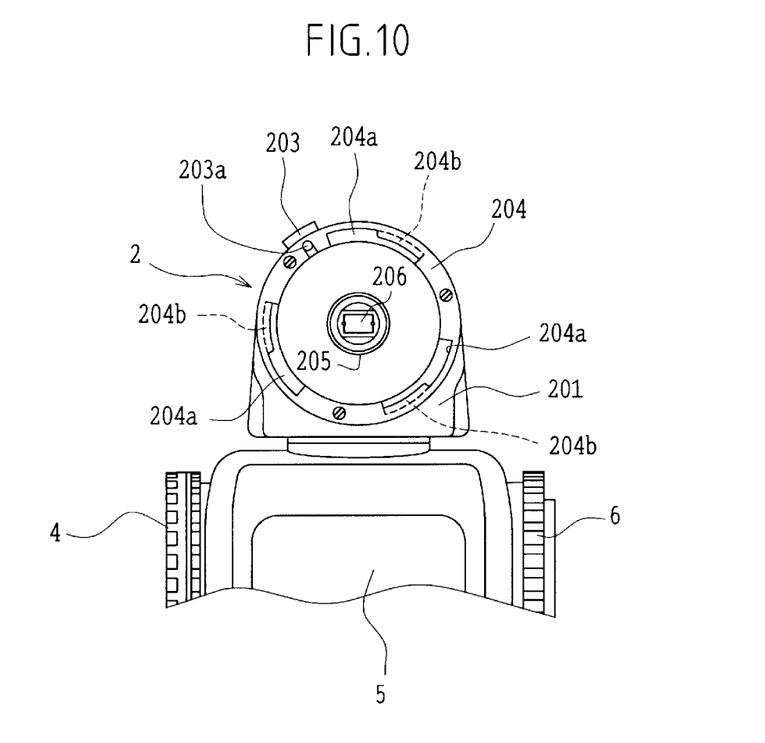
FIG. 10 is a plan view showing the light receiving section body of FIG. 7.

Subsequently, a description is given of essential parts of a light receiving section body 2 with reference to FIGS. 7 and 10. In these figure, reference numeral 201 denotes a light receiving section head whose side wall is provided with a notch 202, having a cylindrical concave portion in which the external cylinder 101 is received in such a way that it can be slid and rotated; 203, a locking piece biased upwardly and fitted into the notch 202, having a pin 203a which can be fitted into the hole 102a of the ring plate 102; 204, a ring plate attached to the top surface of the cylindrical concave portion of the light receiving section head 201, which has three arcuate notches 204a with which the three hooks 102b of the ring plate 102 can be engaged and arcuate cavity grooves 204b extending from the arcuate notches 204a, configured so that the three hooks 102b are capable of creeping into the grooves, and which is capable of restricting the rise of the locking piece 203; and 205, a light receiving element supporting cylinder set upright at the middle of the bottom of the cylindrical concave portion of the light receiving section head 201, incorporating an incident-light receiving element 206.

Figure 11:
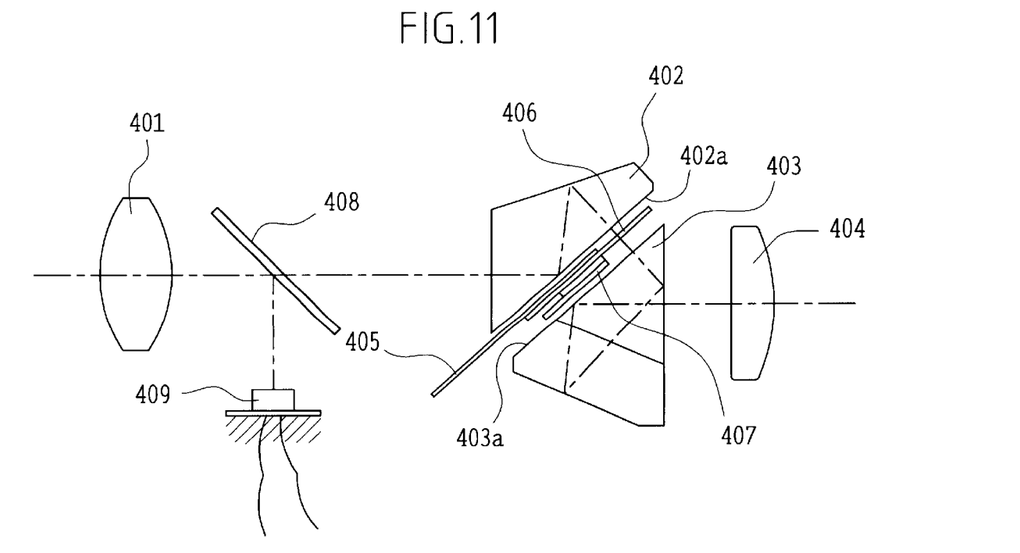
FIG. 11 is a sectional view showing an example of a finder optical system, developed along the optical axis, which is used in the exposure meter of FIG. 1.

In accordance with FIG. 11, the optical system of the finder 4 will be explained below. Reference numeral 401 denotes an object lens of the finder 4; 402, an auxiliary prism for reflecting twice and transmitting reflected light from an object for photometry which is incident thereon after passing through the objective lens 401; 403, a roof prism having an entrance surface 403a which is parallel and opposite to an exit surface 402a of the auxiliary prism 402 in spaced relation, and reflecting three times and transmitting incident light from the auxiliary prism 402; 404, an eyepiece placed on the optical axis of emergent light from the roof prism 403; 405, an EL panel placed adjacent to the exit surface 402a of the auxiliary prism 402; 406, a reticle placed on the image side of the EL panel 405 and adjacent thereto; 407, a liquid crystal panel placed on the image side of the reticle 406 and adjacent thereto; 408, a half mirror placed on the optical axis between the objective lens 401 and the auxiliary prism 402; and 409, a reflected-light receiving element for receiving light incident on the objective lens 401 and reflected by the half mirror 408. The EL panel 405 and the liquid crystal panel 407 constitute the liquid crystal display device, and are provided, together with the reticle 406, in a space between the exit surface 402a of the auxiliary prism 402 and the entrance surface 403a of the roof prism 403. A field mask and a circle indicating a light receiving area are deposited on the reticle 406 by evaporation and the liquid crystal panel 407 is cemented to the reticle 406. The liquid crystal display device is connected to an exposure-value arithmetical element to be described later.

Figure 12:
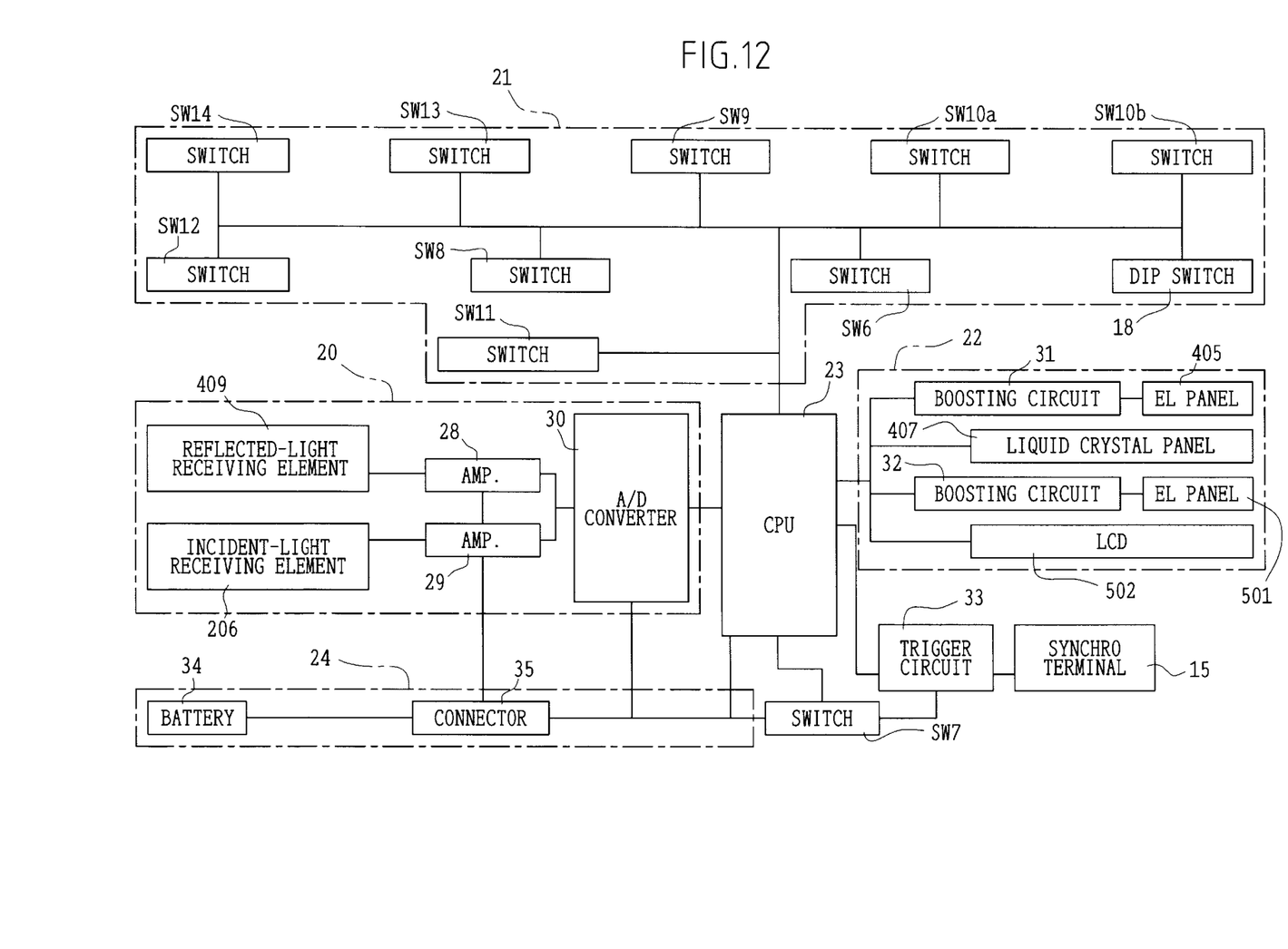
FIG. 12 is a block diagram showing the exposure-value arithmetical element of FIG. 6 and an exposure-value display device.

In FIG. 12, reference numeral 28 denotes an amplifier for amplifying the output of the reflected-light receiving element 409; 29, an amplifier for amplifying the output of the incident-light receiving element 206; and 30, a converter for A/D converting amplified outputs from the incident- and reflected-light receiving elements 206 and 409. These constitute the light receiving circuit 20 of FIG. 6. Reference numeral 31 denotes a boosting circuit for the EL panel 405, connected to the CPU 23, and 32 denotes a boosting circuit for an EL panel 501, connected to the CPU 23 to display the exposure information on the display window 5 (FIG. 1). These constitute the display circuit 22 of FIG. 6. Reference numeral 33 denotes a trigger circuit connected between the synchro terminal 15 (FIG. 1) and the CPU 23. Reference numeral 34 denotes a battery and 35 denotes a connector for connecting the battery 34 to the amplifiers 28 and 29, the A/D converter 30, and the CPU 23. These constitute the power circuit 24 (FIG. 6). Reference symbol SW6 denotes a changeover switch operated by the switching dial 6; SW7, a normally open switch closed by pressing the power button 7; SW8, a normally open switch closed by pressing the average monitor button 8; SW9, a switch changed by turning the setting and conversion dial 9; SW10a, a normally open switch closed by pressing the ISO setting button 10a; SW10b, a normally open switch closed by pressing the ISO setting button 10b; SW11, a normally open switch closed by pressing the mode setting button 11; SW12, a normally open switch closed by the memory button 12; SW13, a normally open switch closed by the memory release button 13; and SW14, a normally open switch closed by the photometry button 14. Any of the above switches is connected to the CPU 23.

Subsequently, a description is given of the function of the above embodiment with reference to FIGS. 1, 6, and 12 in the main. An incident-light photometric mode or a reflected-light photometric mode is selected by turning the switching dial 6 to a preset position. When the incident-light photometric mode is selected, the incident-light receiving section 1 is used and the incident-light receiving element 206 (FIGS. 10 and 12) is brought into an operating condition. At the same time, the EL panel 501 and an LCD 502 of the exposure-value information display circuit 22 are turned on so that the information on exposure values can be displayed on the display window 5.

Incident-Light Photometry

In this state, the power button 7 is first pressed to close the switch SW7 and bring the power circuit 24 into an on condition. When one of the ISO setting buttons 10a and 10b is pressed, one of the switches SW10a and SW10b is closed and the sensitivity of a film used is set so that the EL panel 501 and the LCD 502 of the exposure-value information display circuit 22 are turned on to display the ISO value at a preset position of the display window 5. Then, when the light receiver 109 of the light receiving section is placed at a desired position of the object, the incident-light receiving element 206 in the light receiving circuit 20 receives incident light on the object and the amount of received light is input, as a digital value, into the CPU 23 through the amplifier 29 and the A/D converter 30. In this state, when the setting and conversion dial 9 is turned in a preset direction with the mode setting button 11 pressed, an ordinary-light shutter speed priority mode, an ordinary-light stop priority mode, an ordinary-light EV mode (in the case where the DIP switch 18 (FIG. 4) is operated and this mode is set in a state that it can be displayed), a flashlight cordless mode, a flashlight cordless integrating mode, a flashlight cord-in mode, a flashlight cord-in integrating mode, a flashlight wave trigger setting mode (in the case where the transmitting unit 16 is loaded as shown in FIG. 4), a flashlight wave trigger mode, and a flashlight wave trigger integrating mode are successively selected in this order. When the mode setting button 11 is released, any one of the above modes is set.

When the ordinary-light shutter speed priority mode, for example, is selected in this way, the photometry button 14 is pressed and thereby the film sensitivity and the shutter speed which have been set are taken into account so that the stop value suitable for the amount of incident light is calculated by the CPU 23. Through the exposure-value information display circuit 22, information on exposure values (containing the values of the film sensitivity, the shutter speed, and the stop) is displayed on the display window 5. Similarly, the automatic display of the shutter speed corresponding to a set stop value and an EV value display are possible. By operating the average monitor button 8 and the memory button 12, it is also possible to store the exposure values and display these measured values on the average.

As will be evident from the above explanation, when the transmitting unit 16 is loaded in the housing box 3a of the exposure meter body 3, a flashlight wave trigger circuit is automatically connected to the CPU 23, the power circuit 24, and the antenna 25 and is placed in the operating condition by pressing the power button 7. The setting and conversion dial 9 is turned while pressing the mode setting button 11 and the mode is changed to the flashlight wave trigger mode. In this case, a display that the mode has been changed appears on the display window 5. Subsequently, when the setting and conversion dial 9 is turned again to set the shutter speed and the photometry button 14 is pressed, a preset (reference) frequency signal is output from the transmitting unit 16 and is transmitted to the exterior through the built-in antenna 25. This signal is received by any one of the receiving antennas 27a, 27b, 27c, and 27d, for example, by the receiving antenna 27a, and actuates the flash device F1 through the receiving unit 26a. Flashlight thus emitted is received by the incident-light receiving section 1 and the measured value (stop value) is displayed on the display window 5.

If the measured value in this case is such as to be much larger or smaller than a desired value of brightness, the amount of correction for this will be calculated by the CPU 23. By pressing the photometry button 14 again, a frequency signal corresponding to the amount of correction is output from the transmitting unit 16 and is transmitted to the exterior through the built-in antenna 25. This signal is received by any one of the receiving antennas 27a, 27b, 27c, and 27d, for example, by the receiving antenna 27b, and actuates the flash device F2 through the receiving unit 26b. Flashlight thus emitted has the amount of light, namely brightness, adding the amount of correction to the first measured value.

Hence, when the exposure meter is equipped with the flash devices F2, F3, F4, . . . , each of which emits the amount of light increased or decreased by the amount of correction of a preset proportion to the amount of light emitted from the flash device F1 which is referenced, there is no need that, as in a conventional way, an operator (photographer) separates from a position to be measured and troubles himself to go to the power section of the flash device for adjustment of the amount of light. Consequently, an exposure meter apparatus which is extremely good in work efficiency can be provided.

Although in this case the shutter speed and the stop value are displayed on the display window 3, on the basis of the total amount of light in which the amounts of ordinary light and flashlight are summed, it is also possible to separately display the amounts of ordinary light and flashlight. Also, the transmitting unit 16 can be constructed so that it is provided with a data recording device for recording these measured values and is capable of transmitting data. The exposure meter can also be designed so that when the transmitting unit 16 is not loaded, this unloaded condition is displayed on the display window 5.

Reflected-Light Photometry

Figure 13A:
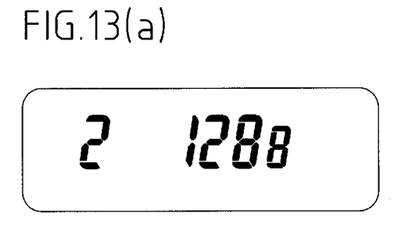
FIGS. 13(a)–13(h) are explanatory views illustrating information on various exposure values calculated by the exposure-value arithmetical element of FIG. 12 and displayed through the exposure-value display device.
Figure 13B:
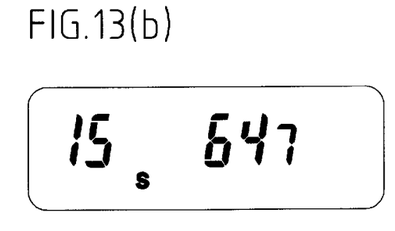
Figure 13C:
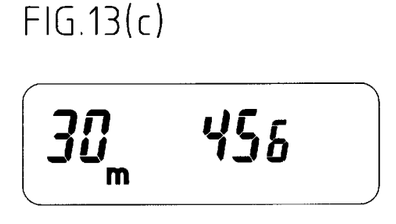
Figure 13D:
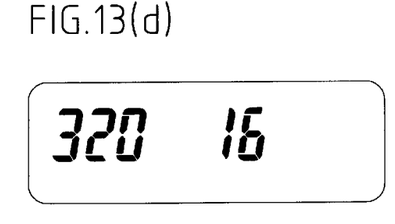
Figure 13E:
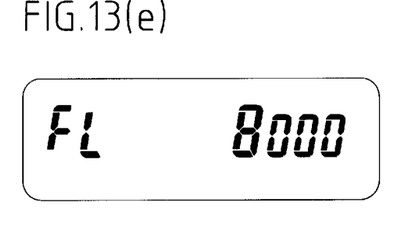
Figure 13F:
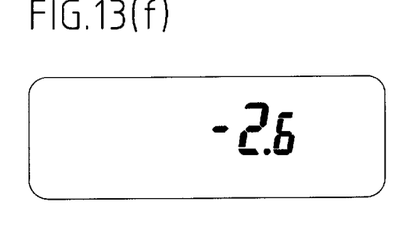
Figure 13G:
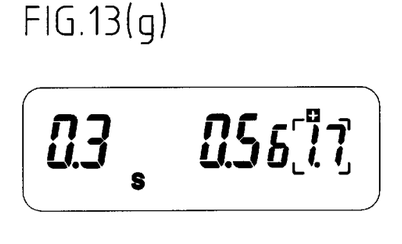
Figure 13H:
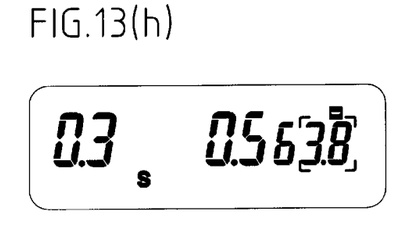

Reflected-light photometry can be executed in such a way that the switching dial 6 is operated to bring about a state that the reflected-light photometry is possible. In this case, the finder 4 is used and the reflected-light receiving element 409 is placed into an operating condition. At the same time, the EL panel 405 and the liquid crystal panel 407 are turned on so that the information on the exposure values can be read in the finder. In accordance with FIGS. 1 and 11–13, reference is made to the function of the exposure meter where the reflected-light photometric mode is selected.

Where the photometry is started, the power button 7 is first pressed to turn on the power switch SW7 and the entire circuit is brought into the operating condition. In this condition, when the setting and conversion dial 9 is turned, for example, with the ISO setting button 10$a$ pressed, the switches SW10$a$ and SW9 are closed and the ISO sensitivity of a film to be used is set so that its numerical value is displayed at a preset position inside the finder 4. Similarly, when the ISO setting button 10$b$ is pressed, the switch SW10$b$ is actuated and setting is made to be suitable for the use of the film of a second ISO sensitivity which is different from the film sensitivity in the case where the switch SW10$a$ is pressed. This ISO setting button 10$b$ is also used in correction for exposure. Subsequently, when the setting and conversion dial 9 is turned in a preset direction while pressing the mode setting button 11, the switches SW11 and SW9 are actuated and the ordinary-light shutter speed priority mode is first selected. When the photometry button 14 is thus pressed, a stop value suitable for the ISO sensitivity and a desired shutter speed which have been set is calculated by the CPU 23 and, for example, as shown in FIG. 13($a$), is displayed at a preset position in a finder field by the liquid crystal panel 407.

The display of FIG. 13($a$) means that a set shutter speed is ½ sec. and a stop value is 128.8; FIG. 13($b$) means that the shutter speed is 15 sec. and the stop value is 64.7; and FIG. 13($c$) means that the shutter speed is 30 min. and the stop value is 45.6. Although each of these stop values changes with the intensity of reflected light incident on the finder 4 each time the photometry button 14 is pushed, this change can be observed while looking through the finder 4. In this case, since an image of an object is reflected twice by the auxiliary prism 402 and three times by the roof prism 403, an erect image can be obtained and the information on the exposure values, together with the image of the object, can be surely viewed without the feeling of fatigue. Also, when the ISO setting button 10$b$ is set as mentioned above, the information on the exposure values corresponding to the film of the second ISO sensitivity, already set, is displayed while the ISO setting button 10$b$ is pressed after photometry.

Subsequently, when the setting and conversion dial 9 is further turned while pressing the mode setting button 11, the ordinary-light stop priority mode is now selected and, for example, as shown in FIG. 13($d$), the display of a stop value of 16 and a shutter speed of 1/320 sec. is given by pushing the photometry button 14. Each time the photometry button 14 is pressed, the value of the shutter speed changes with the intensity of reflected light entering the finder 4, with this stop value unchanged. In this case, when the setting and conversion dial 9 is turned with the mode setting button 11 released, the shutter speed and the stop value can be independently set.

Next, reference is made to the photometry of an EV mode. In this case, after the back lid of the exposure meter body 3 is opened and the DIP switch is operated to change the CPU 23 to a state that the EV mode photometry is possible, the setting and conversion dial 9 is turned to a preset position while pressing the mode setting button 11. By doing so, the EV mode is set. The photometry button 14 is pressed for photometry, and when the photometry button 14 is released, the photometry is completed. An EV value in this case is displayed in the field of the finder 4. At the same time, on the display window 5, the shutter speeds and their corresponding stop values can also be displayed with dot matrix in a combined relation.

Subsequently, the photometric modes of flashlight will be explained below. For this photometry, there are cord connecting, cordless, cord connection integrating, and cordless integrating modes. In the photometry of flashlight, the shutter speed and the stop value (the total amount of light in which ordinary light and flashlight are mixed) are displayed in the field of the finder 4, and three kinds of amounts of light, that is, amounts of ordinary light and flashlight and the total amount of light, are displayed with dot matrix in a dot matrix display section. In this case, the ratio of a flashlight component to the total amount of light is numerically displayed with in 10-% steps. In the cord connecting mode, the synchro cord of the flash device is connected to the synchro terminal 15 so that the mode is changed to a flashlight cord connecting mode by turning the setting and conversion dial 9 while pressing the mode setting button 11, and the shutter speed is set by turning again the setting and conversion dial 9. When the photometry button 14 is thus pressed, the flashlight is emitted and the stop value in this case is displayed. In the cordless mode, the mode setting button 11, as well as the setting and conversion dial 9 and the photometry button 14, is operated in the same manner as the above description for photometry. In this case, the test button, not shown, of the flash device is pushed to thereby emit the flashlight. Also, the integrating mode is such that when a sufficient amount of light is not obtained through light emitted once, light is emitted a plurality of times and a proper stop value is displayed each time the amount of light is integrated.

Each of the above photometric values can be stored by pressing the memory button 12 each time photometry is executed, and a stored photometric value can be eliminated by pressing the memory release button 13. The EV mode is set in the above manner and the ISO sensitivity is set to 100 to look through the finder 4. The EV value is found in such a way that a part to be measured is located in a preset circle of the visual field. From this EV value, an EV-luminance (ft·L or cd/m$^2$) conversion table is used and luminance is calculated through the CPU 23. In this way, for example, as shown in FIG. 13($e$), the result can be displayed. Moreover, the difference of luminance with a standard value, for example, as shown in FIG. 13($f$), can be displayed. By turning the setting and conversion dial 9 in a counterclockwise direction while pushing the ISO setting buttons 10$a$ and 10$b$, a photometric display value can be corrected up to +9.9 EV in +0.1 EV steps. Likewise, by turning the setting and conversion dial 9 in a clockwise direction, the photometric display value can be corrected up to −9.9 EV in −0.1 EV steps. The display of FIG. 13($g$) means that the shutter speed is 0.3 sec. and the stop value is 0.56, with a correction of +1.7 EV. The display of FIG. 13($h$) means that the shutter speed is 0.3 sec. and the stop value is 0.56, with a correction of −3.8 EV.

Next, reference is made to the technique of mounting or dismounting the incident-light receiving section 1 to or out of the light receiving section body 2 and the usage of the incident-light receiving section 1.

The technique of mounting the incident-light receiving section 1 to the light receiving section body 2 is first explained. The incident-light receiving section 1 is held, together with the top flange 101a of the external cylinder 101 and the top flange 103a of the internal cylinder 103, and is aligned with the upper potion of the light receiving section head 201 of the light receiving section body 2 (see FIG. 7) so that the hollow cylindrical portion 101c of the external cylinder 101 is inserted in the cylindrical concave portion of the light receiving section head 201. In this case, it is necessary that the hooks 102b of the ring plate 102 are positioned so as to engage the arcuate notches 204a of the ring plate 204. This can be easily done, for example, when the incident-light receiving section 1 is brought into a state of FIG. 7 and a mark (not shown) provided on the surface of the top flange 103a of the internal cylinder 103 is made to match another mark (not shown) provided on the surface of the light receiving section head 201.

When the incident-light receiving section 1, which is inserted in the cylindrical concave portion in the above manner, is turned clockwise by a predetermined amount, the hooks 102b advance from the arcuate notches 204a into the arcuate cavity grooves 204b. On the other hand, the pin 203a pressed by the ring plate 204 is fitted into the hole 102a of the ring plate 102 by its upward biasing behavior, and the incident-light receiving section 1 is fixedly coupled to the light receiving section head 201. The mounting of the incident-light receiving section 1 to the light receiving section body 2 is thus completed. In this state (FIG. 1), when the top flange 103a is held and turned, for example, in a counterclockwise direction, the pins 108 are restricted by the linear slots 101b and the spiral slots 103b and are moved downward. Consequently, the movable cylinder 106 is moved downward from the position of FIG. 9, and the light receiver 109 is also lowered to the position indicated by chain lines in FIG. 9 and is changed from an exposure measuring state (a setting state where a three-dimensional object, such as a person or a building, is photographed) to a lighting setting state (a setting state where a manuscript or a plane object is photographed, the illumination ratio between main and auxiliary lights is measured, or simple illuminance is measured). When the top flange 103a is turned, from this state, in a direction opposite to the above description, the light receiver 109 is returned to the position of FIG. 7 and is brought into the exposure measuring state. In this case, if, for example, a well-known ball click device is interposed between the top flanges 101a and 103a so that a position corresponding to the exposure measuring state or the writing setting state is detected by the sense of a user's fingers, the operation of the exposure meter can be improved. During the vertical movement of the movable cylinder 106, a space between the internal surface of the movable cylinder 106 and the external surface of the light receiving element supporting cylinder 205 is always held in a watertight fashion by the water-seal member 107, and thus moisture does not penetrate into the space defined by the movable cylinder 106 and the light receiver 109 so that a good photometric condition can be always maintained.

Subsequently, the technique of dismounting the incident-light receiving section 1 from the light receiving section body 2 is explained. In this case, the locking piece 203 is moved downward (leftward in FIG. 2) against its biasing behavior to escape the pin 203a from the hole 102a of the ring plate 102. In this state, it is only necessary to turn the top flange 101a of the external cylinder 101 in a direction opposite to the above description. Specifically, when the top flange 101a is turned in a reverse direction by a predetermined amount, the hooks 102b are escaped from the arcuate cavity grooves 204b to move into the arcuate notches 204a. Hence, when the incident-light receiving section 1 is lifted up at this position, it is removed from the light receiving section body 2.

As will be obvious from the above description, the external cylinder 101 of the incident-light receiving section 1 and the ring plate 102 provided on its lower surface, together with the cylindrical concave portion of the light receiving section head 201 and the ring plate 204 provided on its top surface, constitute a mount section for mounting or dismounting the incident-light receiving section 1 to or from the light receiving section body 2. The linear slots 101b provided in the hollow cylindrical portion 101c of the incident-light receiving section 1, the spiral slots 103b provided in the hollow cylindrical portion 103c, and the pins 108 provided in the movable cylinder 106 constitute a light-receiver raising and lowering mechanism. The mount section is not limited to the above structure and may have any of conventional, well-known structures of a screw type.

Figure 14:
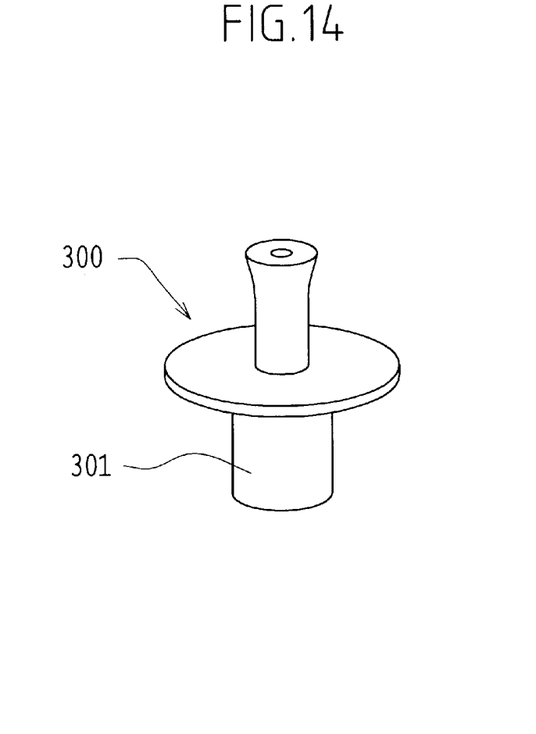
FIG. 14 is a perspective view showing one example of a photometric attachment used in exchange with the incident-light receiving section of FIG. 7.
Figure 15:
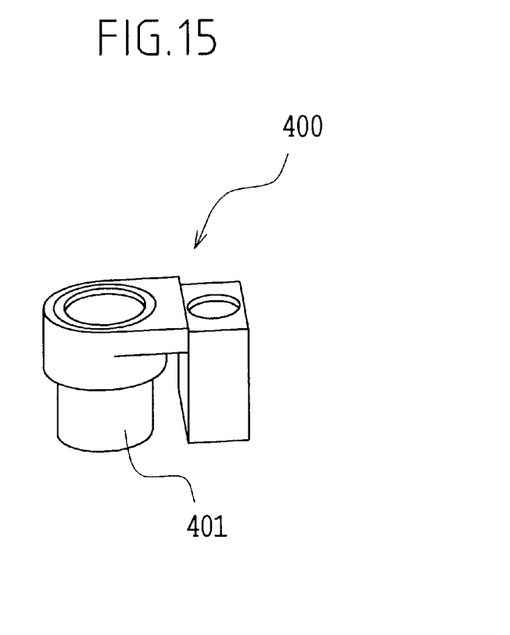
FIG. 15 is a perspective view showing another example of the photometric attachment.

According to the exposure meter of the present invention, as shown in FIG. 14, when the length and outside diameter of a lower cylinder 301 of a pinpoint attachment 300 are configured to be identical with those of the hollow cylindrical portion 101c of the incident-light receiving section 1 and a ring plate similar to the ring plate 102 of the incident-light receiving section 1 is provided on its lower surface, the pinpoint attachment 300 can be mounted to, or dismounted from, the light receiving section body 2 as in the above description, and pinpoint reflected-light photometry and a luminance or contrast-ratio measurement can be made. As shown in FIG. 15, when the length and outside diameter of an external cylinder 401 of a view-finder 400 is configured to be identical with those of the hollow cylindrical portion 101c of the incident-light receiving section 1 and a ring plate similar to the ring plate 102 of the incident-light receiving section 1 is provide on its lower surface, the spot measurement of reflected light becomes possible. Likewise, various types of attachments for photometry can be used.

What is claimed is:

1. An exposure meter for incident- and reflected-light photometry, comprising:

an exposure meter body;

a light receiving section body attached to said exposure meter body to be rotatable in a preset angle range, including an incident light receiving element and a light receiving element supporting cylinder for supporting said incident light receiving element; and an incident-light receiving section mounted to said light receiving section body so as to be dismountable, including a light receiver and a manual operation mechanism having a movable section capable of moving said light receiver to positions for incident-light photometry and lighting setting; and a water seal member mounted to one of said movable section and said light receiving element supporting cylinder in order to fit said movable section to said light receiving element supporting cylinder to be slidable in a watertight fashion, wherein when said incident-light receiving section is mounted to said light receiving section body, said light receiver is aligned with said light receiving element supporting cylinder.

2. An exposure meter for incident and reflected-light photometry according to claim 1, wherein said light receiver has a shape of a hemisphere of milk white color.

3. An exposure meter for incident- and reflected-light photometry, comprising:

an exposure meter body;

an incident-light photometric section mounted to said exposure meter body, including an incident-light receiving element;

a finder for reflected-light photometry incorporated in said exposure meter body, including a reflected-light receiving element;

a first arithmetical element incorporated in said exposure meter body, calculating various exposure values on the basis of photometric results obtained by said incident-light receiving element and said reflected-light receiving element;

a display window for displaying information on exposure values obtained by said first arithmetical element; and a transmitting unit capable of calculating a total amount of flashlight and ordinary light to be displayed on said display window, mountable on and dismountable from said exposure meter body, connected to said first arithmetical element when mounted on said exposure meter body; and a housing box provided on said exposure meter body to house said transmitting unit so that said transmitting unit can be housed in said housing box in only a specific positional relationship between said transmitting unit and said housing box.

* * * * *